Jan. 20, 1953  J. R. BROUGHER  2,626,028
ONE REVOLUTION CLUTCH

Filed April 3, 1947  3 Sheets-Sheet 1

Inventor
J. R. Brougher
By Attorneys

Jan. 20, 1953  J. R. BROUGHER  2,626,028
ONE REVOLUTION CLUTCH
Filed April 3, 1947  3 Sheets-Sheet 2
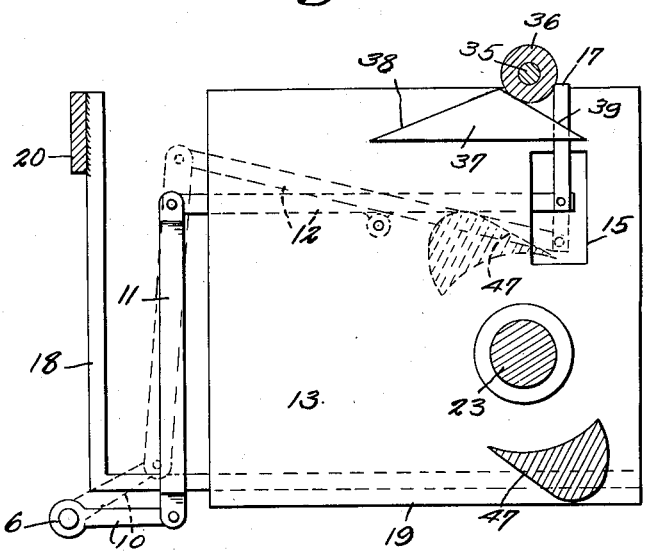
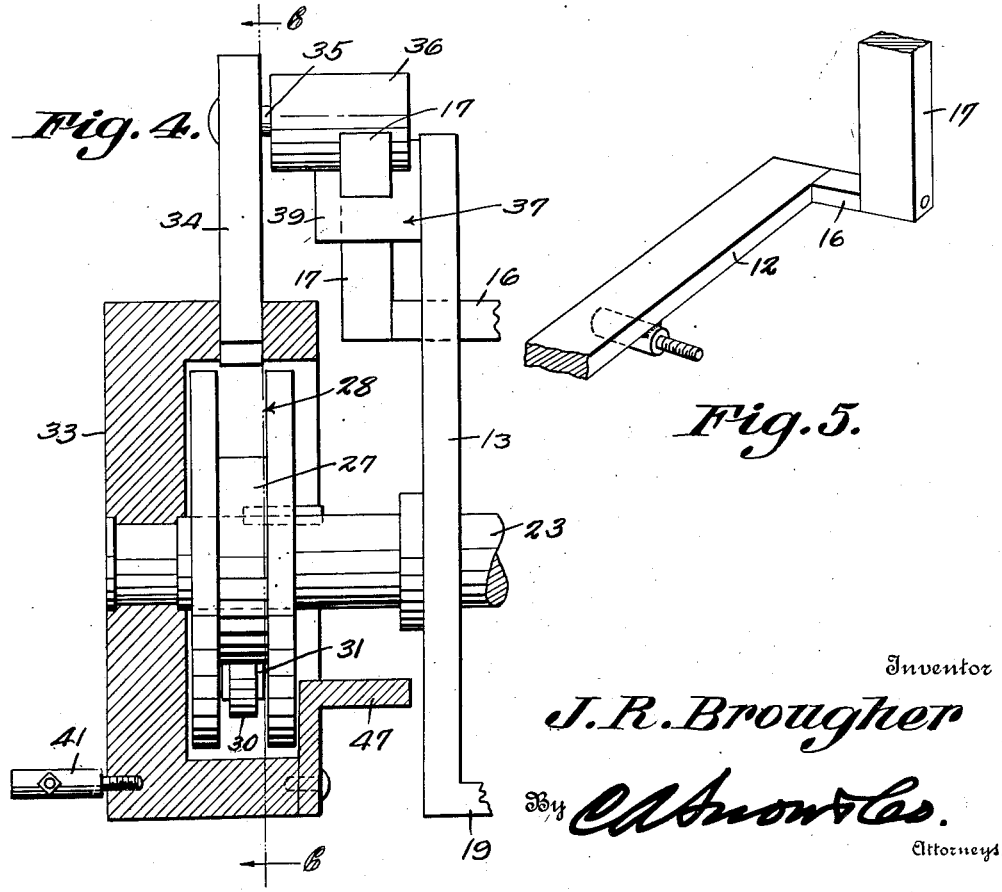
Inventor
J. R. Brougher
By Knowles
Attorneys Jan. 20, 1953 J. R. BROUGHER 2,626,028
ONE REVOLUTION CLUTCH
Filed April 3, 1947 3 Sheets-Sheet 3
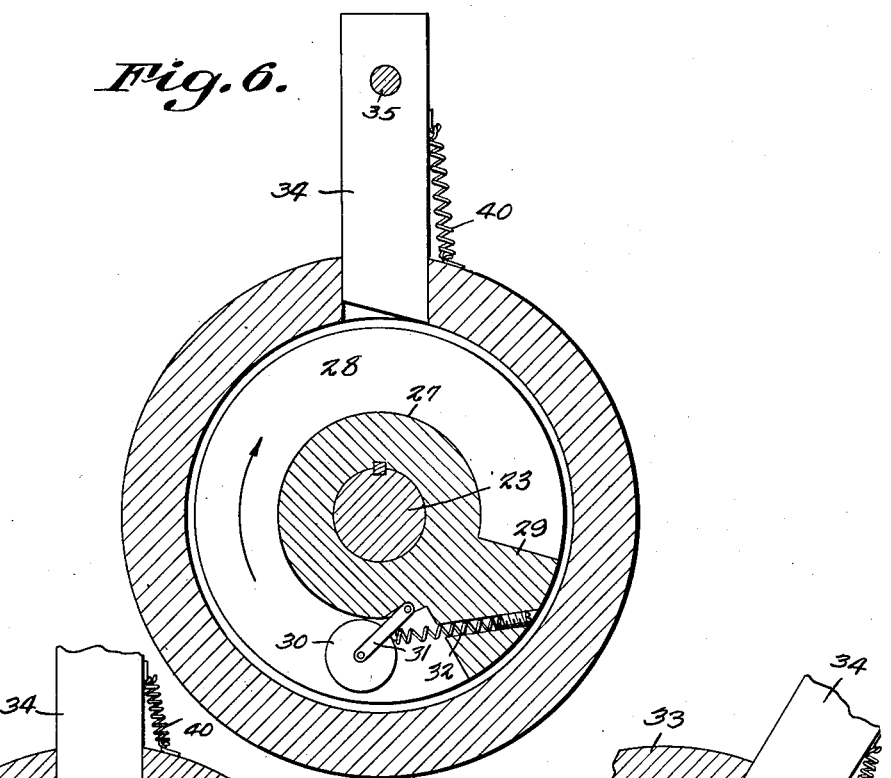
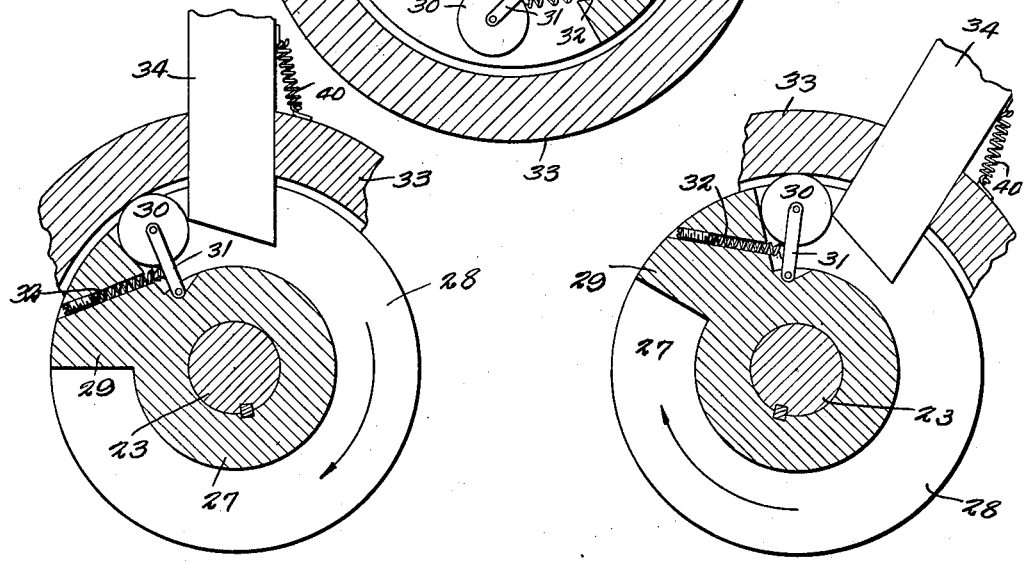
Inventor
J. R. Brougher
By CMKnowles
Attorneys.

Patented Jan. 20, 1953

2,626,028

UNITED STATES PATENT OFFICE 2,626,028

ONE REVOLUTION CLUTCH

John R. Brougher, Calvert, Tex.

Application April 3, 1947, Serial No. 739,077

2 Claims. (Cl. 192—33)

This invention relates to an attachment designed for use in connection with type casting machines, the invention embodying specifically, means for rapidly sending lines of assembled matrices, into machines for casting, without the necessity of the operator removing his hands from the immediate vicinity of the keyboard, to accomplish the line sending in result, thereby appreciably increasing the speed of operation and decreasing the amount of effort on the part of the operator.

An important object of the invention is to provide an attachment of this character which may be readily and easily mounted on the usual type casting machine, eliminating the necessity of making extensive alterations in the construction of the machine to mount the device.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 3 is an elevational view partly in section, illustrating the clutch actuating mechanism, taken on line 3—3 of Figure 2.

Figure 4 is a sectional view through the clutch mechanism.

Figure 5 is a perspective view of the means for holding and releasing the clutch arm of the device.

Figure 6 is a sectional view taken on line 6—6 of Figure 4.

Figure 7 is a fragmental sectional view similar to Figure 6, illustrating the clutch bar as contacting with the roller of the movable section of the clutch.

Figure 8 is a fragmental sectional view through the clutch member, illustrating the clutch bar as rotating with the clutch members.

Figure 1:
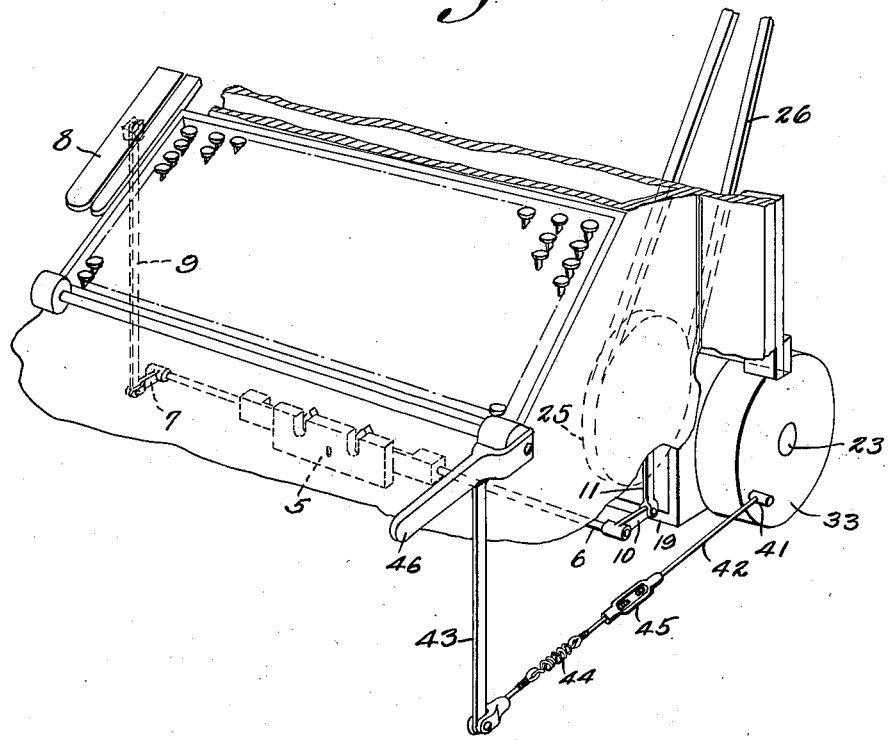
Figure 1 is a perspective view illustrating the key board of a type casting machine, illustrating the device forming the subject matter of the present invention, as attached thereto.
Figure 2:
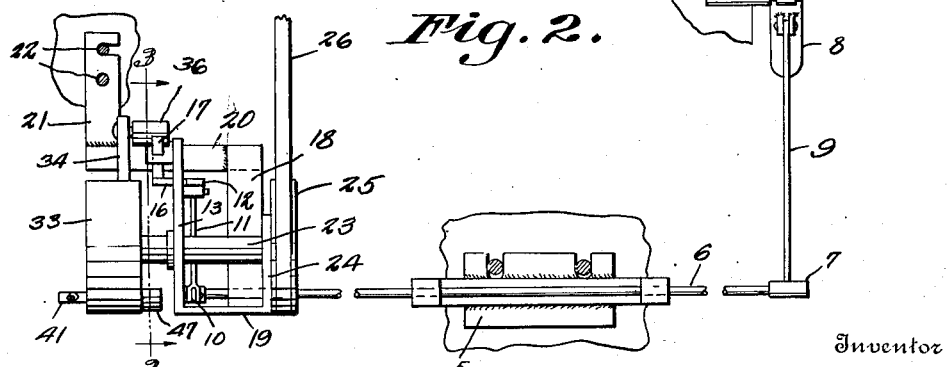
Figure 2 is a rear elevational view of the attachment.

Referring to the drawings in detail, the device comprises the bracket 5 which is secured to the frame of the type casting machine with which the device is used, which bracket provides a support for the main shaft 6 of the device. One end of the main shaft 6 is provided with the arm 7 that moves therewith, which arm is connected to the finger key 8 that is disposed adjacent to one side of the key board, by means of the link or rod 9.

At the opposite end of the main shaft 6, is a link 10 to which the arm 11 is pivotally connected, the upper end of the arm 11 having pivotal connection with the arm 12 which is pivotally supported, intermediate its ends, on the plate 13 forming a part of the attachment.

This plate 13 is formed with an opening 15 through which the offset portion 16 of the arm 12 extends, the offset portion 16 providing a connection between the arm 12 and the stop pin 17.

The plate 13 forms a part of the main portion of the attachment, and to which the arm 18 is connected, the arm extending upwardly from the bottom 19 of the attachment or frame, where it connects with the horizontal arm 20 to which the vertical arm 21 is connected, the arm 21 being in turn connected by the bolts 22 to the typecasting frame.

As shown by Figure 4 of the drawings, a power shaft 23 is mounted in bearings formed in the plate 13 and plate 24 that extends upwardly from the bottom 19, the plates 13 and 24 being spaced apart. On one end of the power shaft 23, is a pulley 25 over which the power belt 26 operates, the power belt receiving its motion from a suitable power device not shown. In operation, this pulley 25 is continually rotating.

On the opposite end of the shaft 23, is a clutch which comprises the inner clutch member 27 which is formed with arcuate shaped groove 28, the hub of the inner clutch member 27 being provided with an enlargement 29 that extends across the groove 28, as clearly shown by Figure 7 of the drawings.

Mounted within the groove, adjacent to the enlargement 29, is the clutch member 30 which is in the form of a roller, pivotally mounted between the walls of the groove 28, by means of the links 31. A coiled spring indicated at 32 and which is of the expansion type, is mounted in a bore formed in the enlargement 29, one end of the spring engaging the links 31 to normally urge the clutch member outwardly or away from the enlargement 29.

The inner clutch member is keyed to the shaft 23, so that as the shaft rotates, the clutch member will move therewith.

The clutch also includes a housing 33 which is in the form of a thick disc-like member hollowed out through a portion of its thickness, in which the inner clutch member rotates. The housing 33 is formed with a bearing opening in which the outer end of the shaft 23 operates. As the housing 33 rotates, the cam 47 extending therefrom engages the lower end of the stop pin 17 elevating the stop pin 17 and returning the pin 17 to its normal position, where it will act as a stop, against which the roller 36 will engage holding the arm in its inactive position.

Formed in the wall of the housing 33, is an opening through which the arm 34 moves, which arm carries the horizontal stub shaft 35 on which the roller 36 rotates. Extending laterally from the outer surface of the plate 13, is a cam block 37, the cam block being formed with an opening through which the stop pin 17 extends, the stop pin being of a length to engage the roller 36 when the roller moves over the upper surface 38 and downwardly over the inclined surface 39 of the cam block.

Thus, it will be seen that due to this construction, when the inner clutch member is locked to the clutch housing 33 by means of the arm 34 engaging the clutch member 30 as shown by Figure 7, the entire clutch including the inner clutch member and housing will rotate with the result that the roller 36 will move to a position over the inclined surface 38 of the cam block 37, and pass downwardly over the inclined surface 39 where it will contact with the stop pin 17 and be held in this position, as shown by Figure 3. It will, of course, be obvious that as the arm 34 moves from its position within the groove of the inner clutch member, the inner clutch member will be released and will continue to rotate independently of the housing which remains stationary.

The housing 33 now remains free of the inner clutch member until the stop pin 17 is depressed and moved away from the roller 36, whereupon the roller will move downwardly, causing the arm 34 to move downwardly under the action of the coiled spring 40 which holds the arm 34 in position on the housing. When the arm 34 moves again into the groove of the inner clutch member, the inner clutch member will upon rotation strike the arm connecting the inner clutch member to the housing.

Extending from the housing 33 is a pin 41 to which the link 42 is connected, the link 42 being connected to the arm 43, through the yieldable connection 44 and turnbuckle 45, the turnbuckle providing means whereby an adjustment may be made between the clutch and arm 43. This arm 43 connects with the lever 46, which is the usual actuating lever designed for actuating the mechanism that was sending in lines of assembled matrices.

What is claimed is:

1. A clutch of the class described, comprising an inner clutch member including a hub, keyed to a continuously operated power shaft, said inner clutch member having an arcuate shaped groove formed in the periphery thereof, a stop at the ends of the groove, a roller pivotally mounted within the groove adapted to engage said stop, a clutch housing in which the clutch member is rotatably mounted, said housing having an opening in the periphery thereof in registry with said groove of the inner clutch member, an arm operating through said opening extending into the groove adapted to engage the roller forcing the roller against the inner surface of the clutch housing connecting the clutch housing with the inner clutch member to rotate therewith, and manually controlled means for effecting engagement of said arm and said roller.

2. A clutch of the class described, comprising an inner disc-like clutch member keyed to a continuously operating power shaft, said inner clutch member having a peripheral groove, a stop at the ends of the groove, a clutch housing in which the disc-like clutch member operates, said housing having an opening in the periphery thereof registering with said groove, a reciprocating arm movable into the groove through said opening, a clutch member mounted in the groove, engaging the stop, said arm engaging the clutch member as said shaft rotates, clutching the inner clutch member to the inner surface of the clutch housing, a stationary cam member mounted exteriorly of the clutch housing, a roller mounted on said arm movable over said cam member disengaging the arm and inner clutch member whereby said inner clutch member moves free of the clutch housing, and manually controlled means for releasing said arm for engagement with said stop.

JOHN R. BROUGHER.

REFERENCES CITED

The following references are of record in the file of this patent:

UNITED STATES PATENTS

| Number | Name | Date |
|---|---|---|
| 787,138 | Wehrlin | Apr. 11, 1905 |
| 1,247,568 | Otis | Nov. 20, 1917 |
| 2,135,919 | Streeter | Nov. 8, 1938 |
| 2,344,410 | Rauh | Mar. 14, 1944 |